United States Patent [19]

Miyata et al.

[11] Patent Number: 5,486,671
[45] Date of Patent: Jan. 23, 1996

[54] HARD FACING APPARATUS FOR APPLYING HARD FACING TO VALVES

[75] Inventors: Hiroshi Miyata; Yoshio Chiba; Osami Noguchi, all of Okegawa, Japan

[73] Assignee: Mitsubishi Materials Corporation, Tokyo, Japan

[21] Appl. No.: 310,068

[22] Filed: Sep. 22, 1994

[30] Foreign Application Priority Data

Dec. 27, 1993 [JP] Japan ..................................... 5-333731

[51] Int. Cl.$^6$ .................................................. B23K 9/04
[52] U.S. Cl. ...................... 219/76.14; 219/125.1
[58] Field of Search .............. 219/125.1, 137 R, 219/76.1, 76.14, 76.15

[56] References Cited

U.S. PATENT DOCUMENTS

| | | | |
|---|---|---|---|
| 2,729,578 | 1/1956 | Hedlund et al. | 219/76.1 |
| 2,862,101 | 11/1958 | Klinke | 219/76.15 |
| 3,813,509 | 5/1974 | Woods et al. | 219/76.14 |

Primary Examiner—Clifford C. Shaw
Attorney, Agent, or Firm—Armstrong, Westerman, Hattori, McLeland & Naughton

[57] ABSTRACT

A hard faced apparatus for applying hard facing to valves including a welding torch for performing hard facing on a valve head of each of valve blanks to be hard faced, a valve blank holding member for holding the valve blank in an oblique position such that the valve head of the valve blank faces the welding torch, and for rotating the valve blank about its axis, and valve transfer apparatus for transferring the valve blank to the valve blank holding member. The valve blank holding member includes valve attaching/positioning apparatus for attaching the valve blank while positioning an axis of the valve blank to be substantially aligned with an axis rotation of the valve blank holding member. Preferably, the valve attaching/positioning apparatus includes a support member formed in its distal end with a V-shaped groove to support the valve blank in an oblique position, axial moving apparatus for moving the support member in the axial direction of the valve blank, and radial moving apparatus for moving the support member in the radial direction of the valve blank.

2 Claims, 3 Drawing Sheets

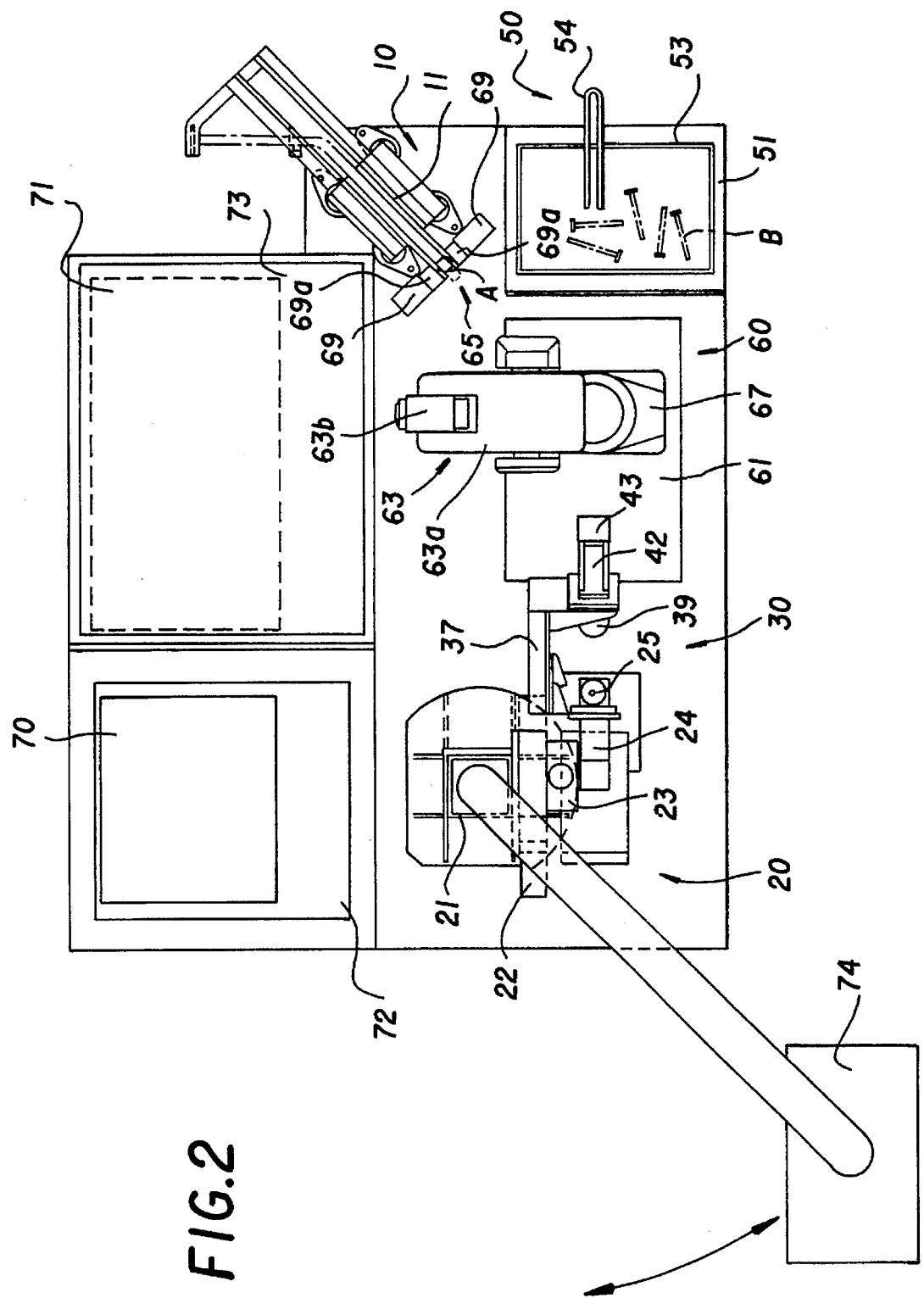

HARD FACING APPARATUS FOR APPLYING HARD FACING TO VALVES

BACKGROUND OF THE INVENTION

1. Field of the Invention

The present invention relates to a hard facing apparatus for hard facing different kinds of materials to valve heads of intake valves or exhaust valves for use with internal combustion engines.

2. Description of the Related Art

As is well known in the art, because valve heads of intake valves or exhaust valves for use with internal combustion engines are repeatedly brought into abutment against valve seats at a high speed, a high degree of wear resistance is required for valve heads. Therefore, as shown in FIG. 4, a highly wear-resistant material (e.g., a cobalt-based alloy, including tungsten, chromium and carbon) is hard faced by welding (as indicated by 3 in FIG. 4) to a valve head 2 of a valve 1. After that, the hard faced portions are mechanically machined (e.g., ground) into a desired shape.

Heretofore, such hard facing to the valve head has been manually carried out by a worker using a welding rod of a cobalt-based alloy with the valve fixedly held on a holder.

The conventional hard facing method, however, has a problem in that because the hard facing is manually conducted by workers, the welded face material varies in thickness and position depending on the amounts of skill of the workers, and the resulting quality of the welded hard faces is not stable.

Also, in the conventional hard facing method, the hard facing is manually conducted by workers such that the worker manually picks up a valve before hard facing (hereinafter referred to as a valve blank), holds it on a holder, performs the hard facing, and takes out the valve after hard facing (hereinafter referred to as a product valve) for discharging it to a valve stock. This raises another problem in that the productivity per unit time is extremely low.

To solve the above problems, it is conceivable to employ a method of grasping a valve blank by a chuck provided at the distal end of a swing arm on a robot hand, swinging the swing arm so as to supply the valve blank grasped by the chuck to a holder, and performing hard facing by a welding torch disposed in opposite relation to a valve head of the valve blank while the valve blank is rotated about its axis. With this method, however, since the valve blank grasped by the chuck is supplied to the holder by swinging the swing arm, the swing arm is moved along an arcuate path and this property of swinging movement makes it difficult to accurately align the axis of the valve blank with an axis of rotation of the holder. If the axis of rotation of the holder and the axis of the valve blank are significantly offset from each other, the distance between the valve head and the welding torch would be cyclically varied during rotation of the valve blank and the thickness of the hard faced portion on the valve head would not be uniform in the circumferential direction, resulting in a problem of reduced quality of the hard facing.

SUMMARY OF THE INVENTION

In view of the above-described state of the art, an object of the present invention is to provide a hard facing apparatus by which hard facing can be performed with stable quality and high productivity, the axis of rotation of the holder and the axis of the valve blank can be accurately aligned with each other, and thereby forming a high-quality hard faced portion with a uniform thickness in the circumferential direction.

The present invention provides a hard facing apparatus for hard facing different kinds of materials on valve heads of intake valves or exhaust valves for use with internal combustion engines, wherein the apparatus comprises a welding torch for performing hard facing on a valve head of each of valve blanks to be hard faced, valve blank holding apparatus for holding the valve blank in an oblique position such that the valve head of the valve blank faces the welding torch, and for rotating the valve blank about its axis, and valve transfer apparatus for transferring the valve blank to the valve blank holding means.

The valve blank holding apparatus includes a valve attaching/positioning apparatus for attaching the valve blank while positioning an axis of the valve blank to be substantially aligned with an axis of rotation of the valve blank holding apparatus.

Preferably, the valve attaching/positioning apparatus includes a support member formed in its distal end with a V-shaped groove against which a valve stem of the valve blank is abutted at its side face to support the valve blank in an oblique position, an axial moving apparatus for moving the support member in the axial direction of the valve blank, and a radial moving apparatus for moving the support member in the radial direction of the valve blank.

With the hard facing apparatus of the present invention, the valve blank is transferred by the valve transfer apparatus to the valve blank holding apparatus and is held by the valve blank holding apparatus in an oblique position such that the valve seat of the valve blank faces the welding torch. Then, the valve blank is positioned and attached by the valve attaching/positioning apparatus such that the axis of the valve blank is substantially aligned with the axis of rotation of the valve blank holding apparatus. Then the valve blank is rotated about its axis. During this rotation, the welding torch carries out hard facing on the valve head to thereby manufacture a production valve.

The axis of the valve blank and the axis of rotation of the valve blank holding apparatus can be accurately aligned with each other by the valve attaching/positioning apparatus. Therefore, a high-quality hard faced portion with a uniform thickness in the circumferential direction can be formed.

BRIEF DESCRIPTION OF THE DRAWINGS

FIG. 2 is a plan view of the face hardening apparatus shown in FIG. 1.

DESCRIPTION OF THE PREFERRED EMBODIMENT

Figure 1:
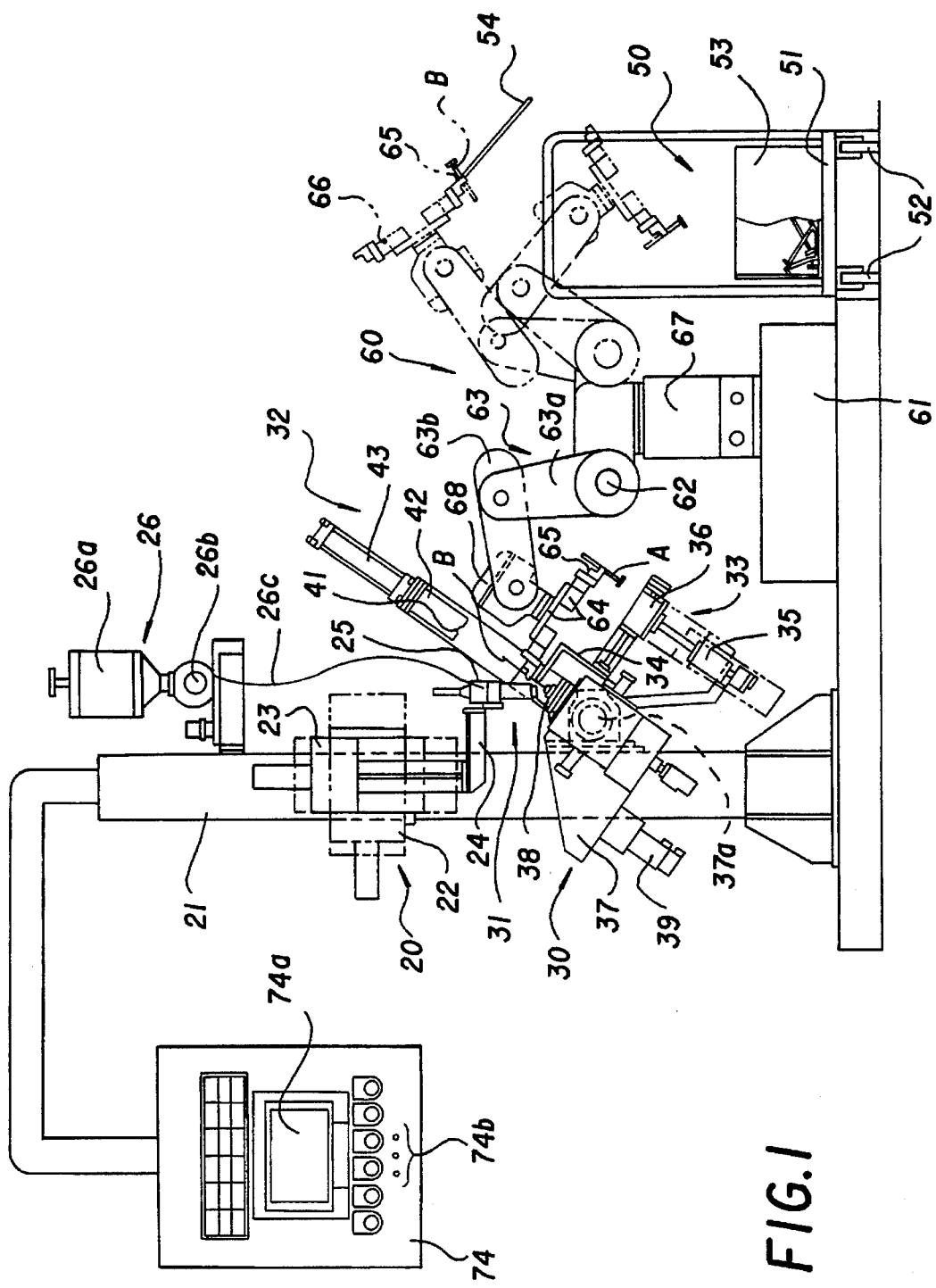
FIG. 1 is a front view of the face hardening apparatus according to a preferred embodiment of the present invention.

A hard facing apparatus according to a preferred embodiment of the present invention will be hereinafter described with reference to the drawings.

The hard facing apparatus of the preferred embodiment comprises valve blank stock apparatus 10 for stocking valve blanks A to be subject to hard facing, welding apparatus 20 for performing hard facing on a valve head of each of the valve blanks A, valve blank holding member 30 for holding the valve blank A in an oblique position such that the valve head of the valve blank A faces a torch 25 of the welding apparatus 20, and for rotating the valve blank A about its axis, product valve stock apparatus 50 for stocking production valves B which have been hard faced by the welding apparatus 20, and valve transfer apparatus 60 for transferring the valve blank A from the valve blank stock apparatus 10 to the valve blank holding member 30 and transferring the production value B from the valve blank holding member 30 to the product valve stock apparatus 50.

The valve blank holding member 30 comprises rotary table apparatus 31 against which the valve head of the valve blank A is abutted at its side end face, valve attaching/detaching apparatus 32 disposed obliquely upwardly of the rotary table apparatus 31 in spaced relationship and pressing a valve stem of the valve blank A from above to hold the valve blank A against the rotary table apparatus 31 in a detachable manner, and valve attaching/positioning apparatus 33 for attaching the valve blank A while positioning an axis of the valve blank A to be substantially aligned with an axis of rotation of the rotary table apparatus 31.

The valve attaching/positioning apparatus 33 includes a support member 34 formed in its distal end with a V-shaped groove against which the valve stem of the valve blank A is abutted at its side face to support the valve blank in an oblique position, axial moving apparatus (e.g., an air cylinder) 35 for moving the support member 34 in the axial direction of the valve blank A, and radial moving apparatus (e.g., an air cylinder) 36 for moving the support member 34 in the radial direction of the valve blank A. The support member 34 is unitedly fixed to a reciprocating member (e.g., a piston rod) of the radial moving apparatus 36, and the radial moving apparatus 36 is attached to a reciprocating member (e.g., a piston rod) of the axial moving apparatus 35. When the reciprocating member of the axial moving apparatus 35 is advanced and retracted, the support member 34 is moved in the axial direction of the valve blank A together with the radial moving apparatus 36.

The valve transfer apparatus 60 includes swing arm 63 mounted to be swingable about one point 62 on the stationary base 61 from the valve blank stock apparatus 10 to the valve blank holding member 30, then from the valve blank holding member 30 to the production valve stock apparatus 50, and then from the product valve stock apparatus 50 to the valve blank stock apparatus 10, a rotating member 64 rotatably attached to the distal end of the swing arm 63, and two chucks 65, 66 attached in two positions along an outer circumference of the rotary member 64 with an axis of rotation of the rotating member 64 located therebetween, each for grasping the valve stem of the valve blank A or the production valve B from each side.

On the stationary base 61, there is mounted a swivel 67 capable of turning in a horizontal plane. One end of the swing arm 63 is coupled to an upper portion of the swivel 67. The swing arm 63 comprises a first arm member 63a pivotally coupled to the swivel 67 and a second arm member 63b pivotally coupled to the distal end of the first arm member 63a. These arm members 63a, 63b are arranged to be able to change their swing angles independently of each other. A motor 68 is attached to the distal end of the second arm member 63b in such a manner that the angle of a motor's rotary shaft with respect to the second arm member 63b is variable. The aforementioned rotating member 64 is fixed to the rotary shaft of the motor 68.

Each of the chucks 65, 66 includes two cylinders 69 juxtaposed in the rotational direction of the rotating member 64, and abutment members attached to respective piston rods 69a of these cylinders 69 and brought into abutment against the valve stem.

The valve blank stock apparatus 10 includes lining-up/supplying apparatus (e.g., a part feeder) for lining up the valve blanks A one-by-one and transferring them successively.

The welding apparatus 20 includes a guide post 21 installed to stand vertically, a carriage 22 mounted to the guide post 21 in a vertically movable manner, a carriage 23 mounted on the carriage 22 in a horizontally movable manner, a bracket 24 fixed to the lower end of the carriage 23, a welding torch 25 attached to the distal end of the bracket 24 so as to extend in the vertical direction, and powder supply apparatus 26 for supplying a welding material in the form of powder to the welding torch 25. The position of the welding torch 25 can be adjusted by moving the carriages 22, 23 in the vertical and horizontal directions.

Figure 3A:
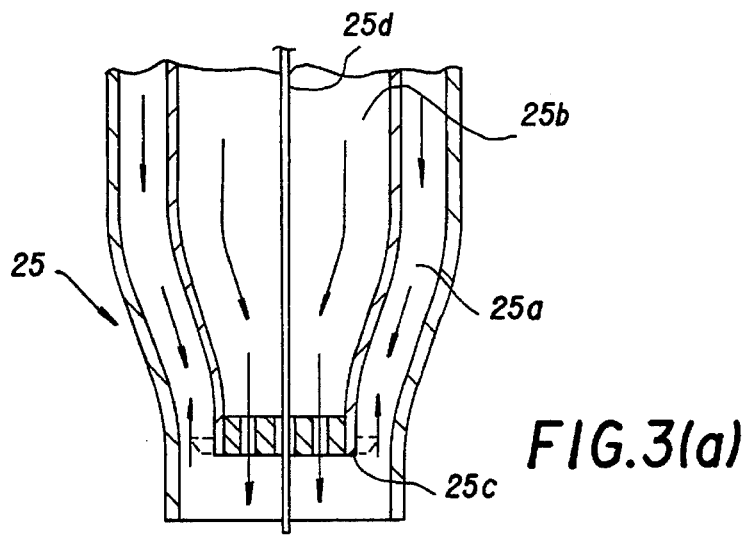
FIGS. 3(a) and 3(b) are cross sectional views of a welding torch for use in the fillet welding apparatus shown in FIG. 1.
Figure 3B:
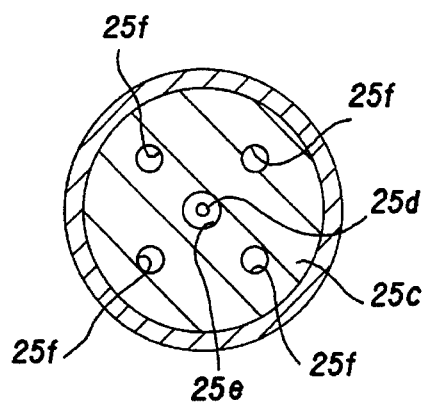
Figure 4:
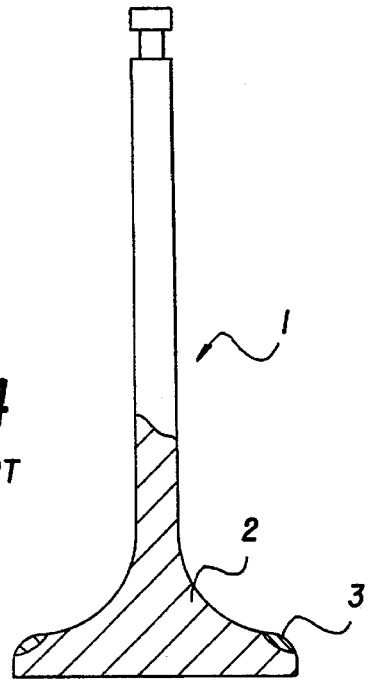
FIG. 4 is a partial sectional view of a valve manufactured by the fillet welding apparatus according to a preferred embodiment of the present invention.

As shown in FIGS. 3(a) and 3(b), the welding torch 25 is in the form of a double-walled pipe. A powdery welding material is supplied under pressure preferably with argon gas through an inner pipe 25b, and a welding gas is supplied under pressure through an annular space between the inner pipe 25b and an outer pipe 25a. A copper-made chip 25c is fixed to the distal end of the inner pipe 25b. The chip 25c has a central penetration hole 25e through which an electrode 25d is inserted, and peripheral penetration holes 25f through which the powdery welding material is injected. A high voltage is applied by the electrode 25d to the welding material injected through the penetration holes 25f to melt the same, and the melted welding material is injected toward the valve head. The diameter of the penetration holes 25f increases over time because of the melted welding material being injected therethrough. Therefore, the chip 25c is replaced by a new one after a predetermined period of use.

The powder supply apparatus 26 comprises a hopper 26a for storing the powdery welding material, a knurled rotating roller 26b to which the welding material in the hopper 26a is dropped, an under-pressure feed pipe 26c through which the powder accumulated on the knurled surface of the roller 26b is supplied under pressure to the welding torch 25 with a flow of argon gas upon rotation of the roller 26b, and not-shown weight measuring apparatus (e.g., a load cell) for measuring the weight of the hopper 26a to properly adjust the amount of the welding material supplied. The weight measuring apparatus measures the total weight of the dead load of the hopper 26a itself and the welding material stored therein. Since the weight of the welding material consumed for hard facing of one valve blank A is too small to be measured accurately, the weight of the welding material consumed is determined from the weight difference between before and after (e.g., 100 times) successive hard facings are carried out, and the determined weight is compared with a preset reference value. The rotational speed of the knurled rotating roller 26b is adjusted in accordance with the compared result, thereby adjusting the amount of the welding material supplied under pressure.

The rotary table 31 comprises a swing block 37 rotatably supported by the guide post 21 through a support 37a, a rotating stage 38 rotatably mounted to the swing block 37, and a motor 39 fixed to the swing block 37 and having a rotary shaft coupled to the rotating stage 38 by a belt.

The valve attaching/detaching apparatus 32 includes a reciprocating block 42 arranged in coaxial relation to the rotating stage 38 and having a groove 41 formed at the center into which the valve stem is inserted, and a cylinder 43 supported by the swing block 37 for advancing and retracting the reciprocating block 42 in coaxial relation to the rotating stage 38.

The production valve stock apparatus 50 includes a carriage buggy 51 having wheels 52 mounted to its underside, a box-shaped pallet 53 resting on the carriage buggy 51 and being open upwardly, and a sampling chute 54 for taking out a sample of the product valves B per predetermined number of the production valves.

In the vicinity of the rotating stage 38 of the valve blank holding means 30, a valve attachment surface grinder (not shown) for grinding an upper surface of the rotating stage 38 is disposed to be movable between a position where it contacts the rotating stage 38 and a position where it is away from the rotating stage 38. The valve attachment surface grinder serves to flatten the valve attachment surface on which welding beads have been deposited.

Furthermore, control apparatus 70 controls the operation of the valve transfer apparatus 60 (e.g., the positions where the valve blanks are grasped by the chucks 65, 66, the position where the valve blank is supplied to the valve blank holding member 30, the position where the product valve is discharged to the production valve stock apparatus 50, the standby time between successive operations, the timing of sampling, the number of the product valves sampled, etc.), 71 is cooling water recirculating apparatus for recirculating cooling water to the welding apparatus 20 and the valve blank holding member 30, 72 is a welding power supply unit for supplying electric power to the welding apparatus 20. Overall control apparatus 73 controls welding conditions such as the position of the welding torch 25 and plasma gas conditions in the welding apparatus 20, powder supply conditions in the powder supply apparatus 26, rotating conditions of the valve blank A in the valve blank holding member 30, etc., and control panel 74 issues commands to the control apparatus 70 for the valve transfer apparatus 60, the cooling water recirculating apparatus 71, the welding power supply unit 72, and the overall control apparatus 73. The control panel 74 includes a display 74a for displaying various pieces of information, knobs 74b for continuously charging the current value of the welding power supply unit 72, the amount of powder supplied by the powder supply means 26, and the rotational speed of the rotating stage 38, etc.

Operation of the hard facing apparatus of this embodiment will be described below.

First, data such as the shape and material of valves to be subject to hard facing and the material to be hard faced on the valves are entered through the control panel 74. Out of many operation programs set for each valve type, one program optimum for the valves to be subject to hard facing is thereby selected. The selected operation program sets, for example, the operation of the valve transfer means 60 (e.g., the positions where the valve blanks are grasped by the chucks 65, 66, the position where the valve blank is supplied to the valve bank holding member 30, the position where the product valve is discharged to the production valve stock apparatus 50, the standby time between successive operations, the timing of sampling, the number of the product valves sampled, etc.), the welding conditions such as the position of the welding torch 25 and plasma gas condition in the welding apparatus 20, the powder supply conditions in the powder supply apparatus 26, rotating conditions of the valve blank A in the valve blank holding member 30, etc. Additionally, the current value of the welding power supply unit 72, the amount of powder supplied by the powder supply means 26, and the rotational speed of the rotating stage 38 may be continuously changed by the knobs 74b while visually checking the data indicated on the display 74a of the control panel 74 and the actual welding status.

Then, a series of operations described below are automatically carried out in accordance with the selected operation program. Therefore, even when hard facing is performed on various types of valves being different in shape and/or material from each other, it is only required to simply select the preset operation program with no need of setting various conditions, and hence the prearranging operation is simple.

More specifically, as indicated by two-dot-chain lines in FIG. 1, the swivel 67 on the stationary base 61 is turned toward the valve blank stock apparatus 1 0, the swing arm 63 is swung about the one point 62, and the rotating member 64 attached to the distal end of the swing arm 63 is rotated to direct the chuck 65 also toward the valve blank stock apparatus 10. The lining-up/supplying apparatus is operated to line up the valve blanks A and supply them successively. The valve stem of each of the valve blanks A supplied is grasped by the chuck 65 from both sides. The position where the valve stem is grasped is set by the operation program so as to provide an appropriate position depending on the shape (such as length and thickness) of the valve.

Then, as indicated by solid lines in FIG. 1, the swivel 67 is turned toward the valve blank holding member 30, and the swing arm 63 is also swung toward the valve blank holding member 30. At this time, the motor 68 is rotated with respect to the second arm member 63b to position the valve blank A grasped by the chuck means 65 such that the axis of rotation of the rotating member 64 is located intermediate the valve blank A and the valve blank holding member 30.

Next, the motor 68 is rotated to turn the rotating member 64 through 180° so that the valve blank A grasped by the chuck means 65 is positioned between the rotating stage 38 of the valve blank holding member 30 and the reciprocating block 42.

Then, the axially moving means 35 is moved in the axial direction of the valve blank A and is stopped when the distal end of the support member 34 reaches a predetermined position. The stopped position is determined depending on the center of gravity of the valve, and is preset by the operation program corresponding to the valve shape. After that, the radial moving apparatus 36 is moved to approach the valve blank A in the radial direction so that the distal end of the support member 34 is abutted against the outer circumference of the valve stem of the valve blank A. Subsequently, the chuck 65 is disengaged and the swing arm 63 is moved slightly away from the valve blank A. Thereby, the valve blank A is released from its grasped state by the chuck 65, and is now held by the support member 34 in an oblique position. Then, the radial moving apparatus 36 is further moved radially of the valve blank A, causing the valve blank A to move toward the rotating stage 38 in the radial direction through the support member 34 so that the axis of the valve blank A and the axis of rotation of the rotating stage 38 are aligned with each other. The amount by which the radial moving apparatus 36 is moved at this time is also preset by the selected operation program.

If the axial alignment was performed by using the swing arm 63, accurate alignment would be difficult because of the swinging movement of the arm 63 along an arcuate path. In contrast, since this embodiment employs the valve attaching/positioning apparatus 33 provided with the axial moving apparatus 35 and the radial moving apparatus 36, the axis of the valve blank A and the axis of rotation of the rotating stage 38 can be aligned with each other with high accuracy. Consequently, when the valve head is subject to face hardening as described below, the high-quality face hardened portion with a uniform thickness in the circumferential direction can be formed.

Next, the cylinder 43 is extended to advance the reciprocating block 42 toward the rotating stage 38. With this advance of the reciprocating block 42, an upper portion of the valve stem of the valve blank A is inserted to the groove 41 defined centrally of the reciprocating block 42, and the valve blank A is pressed and held between the bottom of the groove 41 and the rotating stage 38. After that, the radial moving apparatus 36 is contracted to move the support member 34 away from the outer circumference of the valve blank A. Then, by actuating the motor 39 to rotate the rotating stage 38, the valve blank A also starts rotating with the rotating stage 38.

Concurrently with, or before or after attachment of the valve blank A to the valve blank holding member 30, the carriage 22 is moved along the guide post 21 and the carriage 23 is moved horizontally. With these movements, the welding torch 25 fixed to the carriage 23 is moved to a predetermined position where it faces from above the valve head of the valve blank A having been (or to be) held by the valve blank holding member 30. The amounts by which the carriages 22, 23 are moved at this time are also preset by the selected operation program depending on the valve shape and so on.

Then, the powder supply apparatus 26 is actuated to supply predetermined weight of the welding material to the welding torch 25. The welding material is injected through the penetration hole 25*f* defined in the welding torch 25 while a high voltage is applied from the electrode 25*d* so as to melt the welding material. The melted welding material is injected toward the valve head of the valve blank A. Since the valve blank A is supported by the valve blank holding apparatus 30 in an oblique position during the rotation, the welding material is prevented from flowing out outwardly and is face hardened on the valve head with a uniform thickness in the circumferential direction. Accordingly, a face hardened portion of highly uniform quality may be formed.

While the face hardening is being conducted by the welding torch, the valve blank A to be next face hardened is transferred from the valve blank stock apparatus 10 to a position near the valve blank holding member 30. More specifically, after the valve blank A has been supported by the support member 34, the swing arm 63, etc. are in a free state, i.e., take no part in holding the valve blank A. Therefore, the swing arm 63 is swung, the swivel 67 is turned, and the rotating member 64 is rotated in a predetermined sequence. Thus, the chuck 66 attached to the rotating member 64 of the valve transfer means 60 is positioned to face another valve blank A in the valve blank stock means 10, and is actuated to grasp the valve blank A. Then, the swivel 67, the swing arm 63, etc. are returned to the side of the valve blank holding member 30. At this time, the valve blank A grasped by the chuck 66 is positioned such that the axis of rotation of the rotating member 64 is located intermediate the valve blank A and the valve blank holding 30. In addition, the chuck 65 not grasping valve blank A is positioned to face the valve blank A under welding.

Upon completion of the face hardening, the motor 39 is stopped to cease rotation of the rotating stage 38. Then, the swing arm 63 is slightly moved in the direction of the production valve B which has been subject to the face hardening, so that the chuck 65 attached to the rotating member 64 and not grasping the valve blank is moved toward the product valve B to sandwich the valve stem of the product valve B. Next, the production valve B is grasped by the chuck 65. After that, the cylinder 43 is contracted to move the reciprocating block 42 obliquely upwardly, thereby the product valve B from its pressed state by the reciprocating block 42. In this condition, the motor 68 is actuated to turn the rotating member 64 through 180°. The production valve B grasped by the chuck 65 is moved to a position diametrically opposite to the previous position with the center of the rotating member 64 therebetween, whereas the valve blank A grasped by the chuck means 66 is positioned between the rotating stage 38 and the reciprocating block 42. Subsequently, the valve blank A is aligned with the axis of rotation of the rotating stage 38 in the same manner as described above, and the valve head of the valve blank A is subject to face hardening in the same manner as described above.

After the valve blank A has been held by the valve blank holding member 30, the production valve B grasped by the chuck 65 is transferred to the product valve stock apparatus 50. More specifically, the swing arm 63 is swung and the swivel 67 is turned in a predetermined sequence so that, as indicated by two-dot-chain lines in FIG. 1, the rotating member 64 attached to the distal end of the swing arm 63 is moved to a position above the pallet 53 of the production valve stock apparatus 50. Then, the production valve B is released from its grasped state by the chuck 65 and is dropped into the pallet 53 by gravity to be stored therein. At this time, if the production valve B is dropped from such a high level, the face hardened portion may be damaged or cracked because the production valve B has been subjected to the face hardening just moments before, or the valve portions other than the face hardened portion may be damaged. Therefore, the production valve B is dropped after the swing arm 63 is sufficiently swung so that the production valve B grasped by the chuck 65 comes closely level to the pallet 53. The production valves B are stored within the pallet 53 not in a lined-up state, but at random. Furthermore, the movement of the swing arm 63 is controlled to drop the production valve from a lower level when the number of the production valves B stored in the pallet 53, and to drop it from a progressively higher level as the number of the production valves B stored in the pallet 53 is increased. As a result, the production valves B are smoothly stored in the pallet 53.

Next, after releasing the production valve B, the swing arm 63 is swung and the swivel 67 is turned in the same sequence as described above for grasping a new valve blank A. Thus, the rotating member 64 attached to the distal end of the swing arm 63 is moved toward the valve blank stock apparatus 10 so that the chuck 65 provided on the rotating member 64 grasps the valve blank A. Then, the swing arm 63 is swung and the swivel 67 is turned in the same sequence as described above for transferring the valve blank A toward the valve blank holding member 30. By repeating the above-described steps again thereafter, the valve heads of the valve blanks A can be operated on successively.

In the face hardening apparatus of the preferred embodiment, the steps are simultaneously advanced in parallel such that while the valve blank A is being held by the valve blank holding member 30 and subject to the fillet welding by the welding torch 25, the valve blank A to be next supplied is transferred, or the production valve B is discharged into the production valve stock apparatus 50. Therefore, the loss time in supplying the valve blanks A can be reduced and productivity of the face hardening operation can be increased to a large extent.

According to the face hardening apparatus of the present invention, as described hereinabove, the apparatus comprises a welding torch for performing face hardening on a valve head of each of valve blanks to be face hardened, a valve blank holding member for holding the valve blank in an oblique position such that the valve head of the valve blank faces the welding torch, and for rotating the valve blank about its axis, and valve transfer apparatus for transferring the valve blank to the valve blank holding member, and the valve blank holding member comprises valve attaching/positioning apparatus for attaching the valve blank while positioning an axis of the valve blank to be substantially aligned with an axis of rotation of the valve blank holding member. Therefore, the face hardening can be performed with stable quality and high productivity can be achieved. It is also possible to accurately align the axis of the valve blank with the axis of rotation of the valve blank holding member, and hence to form the high-quality face-hardened portion with a uniform thickness in the circumferential direction.

What is claimed:

1. A hard facing apparatus for applying a hard facing material to a valve head of an intake valve or an exhaust valve for use with internal combustion engines, said apparatus comprising:

a welding torch for performing hard facing on a valve head of a valve blank to be hard faced;

valve blank holding means for holding said valve blank in an oblique position such that said valve head of said valve blank faces said welding torch, and for rotating said valve blank about its axis; and valve transfer means for transferring said valve blank to said valve blank holding means, said valve blank holding means comprising valve attaching/positioning means for attaching said valve blank to said valve blank holding means while positioning a stem of said valve blank so that an axis of said valve blank is substantially aligned with an axis of rotation of said valve blank holding means.

2. A hard facing apparatus according to claim 1, wherein said valve attaching/positioning means comprises:

a support member formed at a distal end with a V-shaped groove against which a valve stem of said valve blank is abutted at its side face to support said valve blank in an oblique position;

axial moving means for moving said support member in an axial direction of said valve blank; and radial moving means for moving said support member in a radial direction of said valve blank.

* * * * *